United States Patent [19]

Desblache

[11] 4,231,094
[45] Oct. 28, 1980

[54] METHOD AND DEVICE FOR DETERMINING THE PHASE INTERCEPT IN A SYSTEM EMPLOYING PHASE-SHIFT KEYING MODULATION

[75] Inventor: Andre E. Desblache, Nice, France

[73] Assignee: International Business Machines Corporation, Armonk, N.Y.

[21] Appl. No.: 950,488

[22] Filed: Oct. 11, 1978

[30] Foreign Application Priority Data

Oct. 27, 1977 [FR] France ................. 77 33121

[51] Int. Cl.³ .................. H04B 3/46; G06F 15/31
[52] U.S. Cl. .................... 364/514; 324/57 DE; 364/487; 375/57; 375/83
[58] Field of Search ................. 364/487, 514; 324/57 DE, 77 E, 83 Q; 325/65, 67, 363; 375/57, 83

[56] References Cited

U.S. PATENT DOCUMENTS

| | | | |
|---|---|---|---|
| 3,629,696 | 12/1971 | Bartelink | 324/57 DE |
| 3,706,931 | 12/1972 | Subramanian | 324/57 DE X |
| 3,842,247 | 10/1974 | Anderson | 324/57 DE X |
| 4,039,769 | 8/1977 | Bradley | 324/57 DE X |

Primary Examiner—Jerry Smith
Attorney, Agent, or Firm—Gerald R. Woods

[57] ABSTRACT

A method and device for measuring the slope of the envelope delay characteristic of a transmission channel and deriving the phase intercept value therefrom. A measurment signal having a frequency spectrum including three rays at frequencies $f_o$, $f_1$ and $f_2$ is sent over the transmission channel. Frequency $f_o$ is the carrier frequency and frequencies $f_1$ and $f_2$ are defined as $f_1=f_o-\frac{1}{2}T$ and $f_2=f_o+\frac{1}{2}T$, where $1/T$ is the signaling rate. At the output of the channel, the three components at frequencies $f_o$, $f_1$ and $f_2$ are extracted from the received measurement signal, and the instantaneous phases $\psi_o$, $\psi_1$ and $\psi_2$ of these three components are then measured. The value of the slope S of the envelope delay characteristic is obtained in accordance with the relation $$S = \frac{4}{2\pi (f_2 - f_1)} (2\psi_o - \psi_1 - \psi_2 - 2\phi_o' + \phi_1' + \phi_2')$$

where $\phi_o'$, $\phi_1'$ and $\phi_2'$ are the phases of the three rays at frequencies $f_o$, $f_1$ and $f_2$ of the measurement signal sent over the channel. The value of the phase intercept $\phi_i$ for a given sampling phase $\phi_s$ is determined in accordance with the relation

$$\phi_i = \phi_o - KS$$

where $\phi_i$ is the phase of the component at frequency $f_o$ received at the instant $$t_s = \frac{T}{2\pi} \phi_s$$

K is a proportionality constant lying between 0 and 1, and
S is the slope expressed in milliseconds.

9 Claims, 11 Drawing Figures

METHOD AND DEVICE FOR DETERMINING THE PHASE INTERCEPT IN A SYSTEM EMPLOYING PHASE-SHIFT KEYING MODULATION

TECHNICAL FIELD

This invention relates to data transmission systems employing phase-shift keying modulation and, more particularly, to a method and a device for determining the initial phase of the carrier received by a data receiver which uses coherent detection.

Phase-shift keying (PSK) modulation is a widely used technique which is described in detail in the books entitled "Data Transmission", by R. W. Bennett and J. R. Davey, Chapter 10, McGraw-Hill, New York, 1965, and "Principles of Data Communication", by R. W. Lucky, J. Salz and E. J. Weldon, Jr., Chapter 9, McGraw-Hill, New York, 1968. In the PSK modulation technique, the sequence of bits to be transmitted is first converted into a sequence of symbols, each of which can take on a discrete number of values that is generally equal to a power of two. These symbols are then transmitted one at a time, at instants which have a T-second spacing and are called signaling instants, by means of a carrier, by causing each symbol to correspond to a given phase shift relative to the phase of the immediately preceding symbol. The carrier, as modulated by these phase changes, is applied to the input of the transmission channel. The receiver, connected to the output of the channel, examines the carrier received at the signaling instants and detects the transmitted data.

Coherent detection of a PSK signal is a widely used technique and is also described in the two books referred to above. Briefly, coherent detection involves measuring the phase of the received modulated carrier by comparing the phase of the received carrier with a local phase reference. One of the main problems to be solved by the data detection system arises from distortions introduced by the transmission channel which alter the phase of the received signal. Among these distortions, phase intercept plays a significant part in the initialization of the data detection system. Phase intercept is discussed in the publication entitled "Transmission Parameters Affecting Voiceband Transmission—Description of Parameters", Bell System Data Communications Technical Reference, PUB 41008, July 1974. Briefly, phase intercept arises from the nonlinearity of the phase-frequency characteristic of the transmission channel and causes a shift in phase of the received signal. This phase shift must be considered in order for the data to be correctly detected. If the phase of the received carrier, in addition to containing a term representing data, exhibits a shift due to phase intercept, it is necessary for the local phase reference to exhibit the same phase shift in order that a comparison between the phase of the received carrier and the phase reference may provide the data.

BACKGROUND ART

Devices intended to overcome the effects of phase intercept, notably the system described in U.S. Pat. No. 3,972,000, are known in the art. That system, which uses a phase-locked loop, effectively overcomes the effects of phase intercept under steadystate conditions, but is relatively slow to reach this state as are all phase-locked loop systems. It is, therefore, desirable to provide means for initializing the loop as quickly as possible before the data transmission starts.

Copending U.S. patent application Ser. No. 950,489 filed Oct. 11, 1978 by the present applicant describes a method for measuring the slope of the envelope delay characteristic of a transmission channel. The envelope delay characteristic represents the variations of the slope of the phase-frequency characteristic of the channel, and means have been found for deriving the phase intercept value from that of the slope of the envelope delay characteristic of the channel as measured in accordance with the method described in copending patent application Ser. No. 950,489.

SUMMARY OF THE INVENTION

It is an object of the present invention to provide a method and a device for determining the phase intercept value whereby transmission systems employing PSK modulation can quickly be initialized.

This and other objects are generally achieved through the use of a method and a device in which the slope of the envelope delay characteristic of the transmission channel is measured and the phase intercept value is then derived therefrom.

In accordance with the method of the present invention, a measurement signal whose frequency spectrum includes three rays are frequencies $f_o$, $f_1$ and $f_2$ is sent over the transmission channel. Frequency $f_o$ is the carrier frequency and frequencies $f_1$ and $f_2$ are defined as $f_1 = f_o - \frac{1}{2}T$ and $f_2 = f_o + \frac{1}{2}T$, where $1/T$ is the signaling rate. At the output of the channel, the three components at frequencies $f_o$, $f_1$ and $f_2$ are extracted from the received measurement signal, and the instantaneous phases $\psi_o$, $\psi_1$ and $\psi_2$ of these three components are measured. The value of the slope S of the envelope delay characteristic is obtained in accordance with the relation $$S = \frac{4}{2\pi (f_2 - f_1)} (2\psi_o - \psi_1 - \psi_2 - 2\phi_o' + \phi_1' + \phi_2')$$

where $\phi_o'$, $\phi_1'$ and $\phi_2'$ are the phases of the three rays at frequencies $f_o$, $f_1$ and $f_2$ of the measurement signal sent over the channel.

The value of the phase intercept $\phi_i$ for a given sampling phase $\phi_s$ is determined in accordance with the relation $$\phi_i = \phi_o - KS$$

where $\phi_o$ is the phase of the component at frequency $f_o$ received at the instant $$t_s = \frac{T}{2\pi} \phi_s$$

K is a proportionality constant lying between 0 and 1, and

S is the slope expressed in milliseconds.

According to another aspect of the invention, the measurement signal is generated by causing the carrier to undergo successive phase changes of $+\pi/2$ and $-\pi/2$ radians at the signaling rate.

BRIEF DESCRIPTION OF THE DRAWINGS

The foregoing and other objects, features and advantages of the invention will be apparent from the following detailed description of a preferred embodiment of the invention as illustrated in the accompanying drawings, wherein:

FIG. 5 on the sheet bearing FIG. 3 shows an exemplary embodiment of the filters 35 and 36 used in the receiver of FIG. 4;

DETAILED DESCRIPTION

Figure 1:
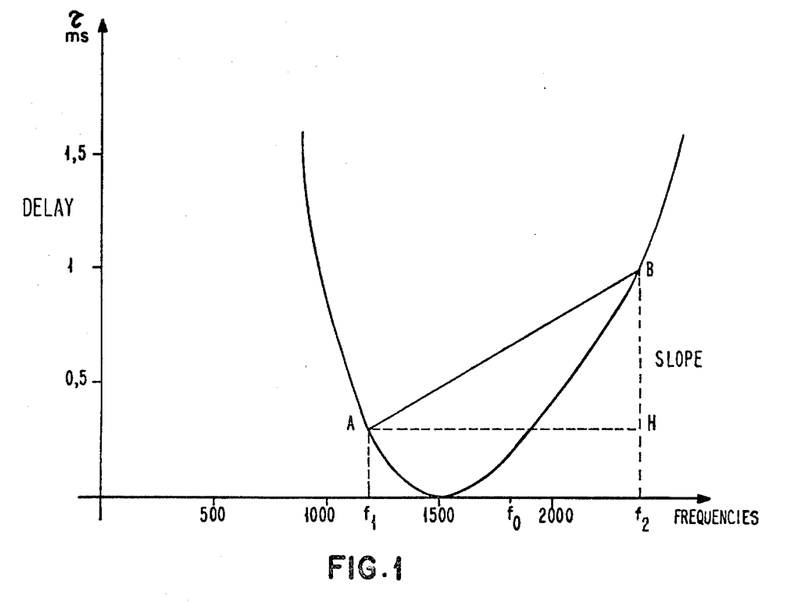
FIG. 1 shows a typical envelope delay characteristic of a voiceband transmission channel.

Referring now to FIG. 1, a typical envelope delay characteristic of a 300–3400 Hz voiceband transmission channel is shown. The curve represents the relative envelope delays at various frequencies with respect to the envelope delay at frequency 1500 Hz taken as a reference. Points A and B on this curve represent the envelope delays at frequencies $f_1 = 1200$ Hz and $f_2 = 2400$ Hz, while point H is the projection of point A on the perpendicular to the axis of frequencies at point $f_2 = 2400$ Hz. It was found that the envelope delay characteristic could be defined by means of its slope, which is represented in the figure by line segment BH. Frequencies $f_1$ and $f_2$ lie at the edges of the useful passband of the transmission channel. In general, these frequencies are those for which in attenuation of $-6$ dB or $-3$ dB is obtained on the amplitude-frequency characteristic of the transmitted signal.

The first step in determining the phase intercept value consists of measuring the slope of the envelope delay characteristic, as described in copending U.S. patent application Ser. No. 950,489. To do so, a measurement signal whose frequency spectrum is comprised of three rays at frequencies $f_o$, $f_1$ and $f_2$ is sent over the transmission channel, with frequency $f_o$ being the carrier frequency and frequencies $f_1$ and $f_2$ being defined as $$f_1 = f_o - \tfrac{1}{2}T$$

$$f_2 = f_o + \tfrac{1}{2}T$$

where $1/T$ is the signaling rate.

Where the method of measuring the slope is implemented in a data transmission system employing PSK modulation, the measurement signal defined above is advantageously generated by causing the carrier to undergo successive phase changes of $+\pi/2$ and $-\pi/2$ radians at the signaling rate $1/T$. It can readily be verified that the signal thus obtained exhibits a spectrum comprised of three rays, one of which is at the carrier frequency $f_o$ while the other two are respectively at frequencies $f_1$ and $f_2$.

Figure 2:
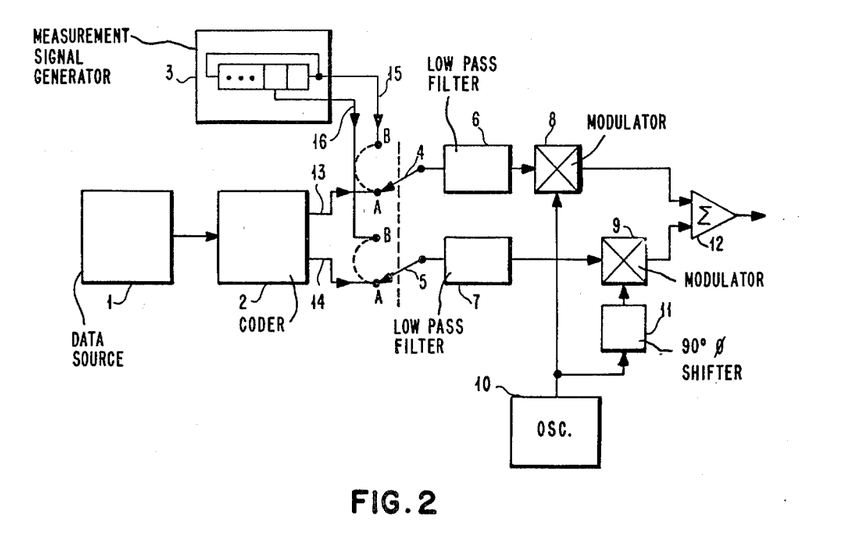
FIG. 2 is a block diagram of a transmitter employing PSK modulation.

Referring now to FIG. 2, a simplified block diagram of a PSK transmitter incorporating the present invention is shown. With the exception of the measurement signal generator 3, the transmitter illustrated in FIG. 2 is a conventional transmitter intended for a synchronous data transmission system using PSK modulation. The transmitter includes a data source 1, a coder 2, a measurement signal generator 3, a pair of two-position switches 4 and 5, two low pass filters 6 and 7, two modulators 8 and 9, an oscillator 10, a 90° phase shifter 11 and a summing device 12. The data source 1 is connected to the input of coder 2 whose outputs are respectively connected via lines 13 and 14 to position A of each of the switches 4 and 5. The measurement signal generator 3 has two outputs respectively connected via lines 15 and 16 to position B of each of the switches 4 and 5. The outputs of switches 4 and 5 are respectively connected to the input of two identical low pass filters 6 and 7 whose outputs are respectively connected to an input of each of the modulators 8 and 9. The other input of modulator 8 is provided by an oscillator 10 while the other input of modulator 9 is connected to the output of oscillator 10 through the 90° phase shifter 11. The outputs of modulators 8 and 9 are respectively connected to the (+) and (−) inputs of summing device 12 which has its output connected to the input of the transmission channel.

In the data mode of operation, that is, when the system is transmitting data, switches 4 and 5 are both set to position A. The data bits to be transmitted, as supplied by source 1, are converted in coder 2 into two sequences of symbols. At each of the signaling instants defined by the signaling rate $1/T$ expressed in bauds, two symbols, one from each sequence, are respectively fed via switches 4 and 5 to filters 6 and 7. A pair of symbols represents the in-phase and quadrature components in a system of rectangular coordinates of the signal to be transmitted. The in-phase and quadrature components are respectively available on lines 13 and 14. Each of these components takes the form of a pulse, the amplitude of which is related to the value of that component. The pulses corresponding to the in-phase and quadrature components are applied to filters 6 and 7 which convert them respectively into a pair of signals called baseband signal elements whose shape is more suitable for transmission. The signal elements so obtained are respectively used to modulate an "in-phase" carrier and a "quadrature" carrier by means of modulators 8 and 9. The in-phase carrier is directly provided by oscillator 10 whereas the quadrature carrier is obtained by using the 90° phase shifter 11 to introduce a 90° change in the phase of the in-phase carrier supplied by oscillator 10. The modulated signals obtained at the output of modulators 8 and 9 are combined in summing device 12 and applied to the input of the transmission channel.

Figure 3:
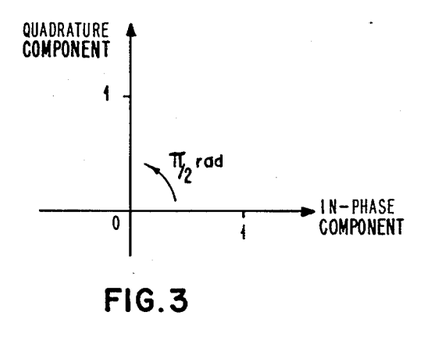
FIG. 3 is a diagram showing the signal points used to generate the measurement signal.

To measure the slope, the transmitted carrier is caused to undergo successive phase changes of $+\pi/2$ and $-\pi/2$ radians to provide the measurement signal. In the transmitter illustrated in FIG. 2, the measurement signal is generated by repetitively causing the phase of the carrier to be successively equal to 0 and the $+\pi/2$ radians. It will be appreciated that a carrier whose phases are equal to 0, $\pi/2$, 0, $\pi/2$, 0, $\pi/2$, 0, $\pi/2$ ... is equivalent to a carrier exhibiting phase changes of $+\pi/2$, $-\pi/2$, $+\pi/2$, $-\pi/2$ ... To cause the phase of the carrier to be equal to 0, a signal whose in-phase and quadrature components are respectively equal to 1 and 0 is transmitted. To cause the phase of the carrier to be equal to $\pi/2$, a signal whose in-phase and quadrature components are respectively equal to 0 and 1 is transmitted (see FIG. 3).

Referring again to FIG. 2, in the measurement mode of operation, switches 4 and 5 are both set to position B. Measurement signal generator 3 provides sequence X: 101010101 ..., on line 15 and sequence Y: 010101010 ..., on line 16, at the signaling rate. Both sequences can be obtained from a signal shift register which stores a sequence 10101010 ... and which has first and second stages respectively connected to lines 15 and 16, as shown in FIG. 2. The application of sequences X and Y to lines 15 and 16 results in the transmission of signals whose in-phase and quadrature components are equal to (1,0), (0,1), (1,0), (0,1), ..., that is, results in the transmission of a carrier that exhibits successive phase changes of $+\pi/2$ and $-\pi/2$ radians.

Figure 4:
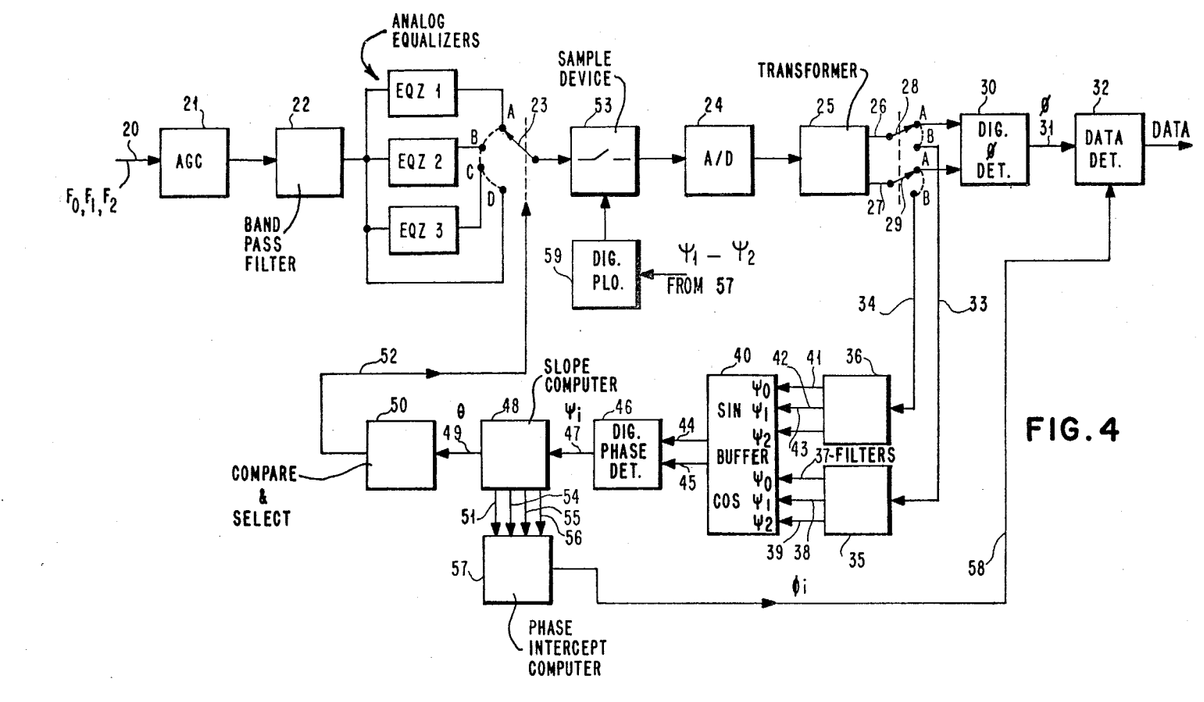
FIG. 4 is a block diagram of a PSK receiver incorporating the invention.

FIG. 4 is a block diagram of a data receiver incorporating the invention. The signal received from the transmission channel via line 20 is applied to an automatic gain control (AGC) circuit 21 which normalizes the energy of the signal. The output from AGC circuit 21 is applied to a bandpass filter 22 which rejects the out-of-band noise. The output from filter 22 is applied in parallel to a set of analog fixed equalizers. For clarity, only three equalizers EQZ 1, EQZ 2, EQZ 3 have been illustrated. An analog fixed equalizer is a wellknown device, a description of which may be found, for example, in U.S. Pat. No. 3,733,565. The outputs of equalizers EQZ 1-EQZ 3 are respectively connected to positions A, B and C of a four-position switch 23. Position D of switch 23 is directly connected to the output of filter 22. The output of switch 23 is connected to the input of a sampling device 53, the output of which is connected to the input of an analog-to-digital (A/D) converter 24. The output of converter 24 is connected to the input of a digital Hilbert transformer 25. A Hilbert transformer is a device which supplies the in-phase and quadrature components of an input signal. A digital embodiment of such a device is described in an article by L. R. Robiner and C. M. Rader entitled "Theory and Implementation of the Discrete Hilbert Transform", in Digital Signal Processing, IEEE Press, 1972. The Hilbert transformer 25 has two outputs which are respectively connected via lines 26 and 27 to the common inputs of a pair of two-position switches 28 and 29. Positions A of these switches are respectively connected to the inputs of a digital phase detector 30 which has its output connected via line 31 to the input of a data detection device 32. A detailed description of a digital phase detector may be found in U.S. Pat. No. 3,825,737, and an exemplary embodiment of a suitable data detection device is described in U.S. Pat. No. 3,972,000. Positions B of switches 28 and 29 are respectively connected via lines 33 and 34 to the inputs of two identical filters 35 and 36 which will be described later with reference to FIG. 5. Filter 35 has three outputs respectively connected via lines 37, 38 and 39 to the input of a buffer 40 to be described later with respect to FIG. 6. Filter 36 also has three outputs which are respectively connected via lines 41, 42 and 43 to the input of buffer 40. Buffer 40 has two outputs respectively connected via lines 44 and 45 to the inputs of a digital phase detector 46 identical to detector 30. The output of detector 46 is connected via line 47 to the input of a slope computation device 48, one of whose outputs is connected via line 49 to the input of a comparison and selection device 50 which controls the operation of switch 23 via line 52. Slope computation device 48 has four additional outputs connected via lines 51, 54, 55 and 56 to the input of a phase intercept value computation device 57. Devices 48, 50 and 57 are to be described in detail later with reference to FIGS. 7, 8 and 9, respectively. The output from device 57 is applied to the data detection device 32, which will be described later with reference to FIG. 10. A digital phase-locked oscillator 59 receives from device 57 a phase adjustment signal and supplies at the signaling rate $1/T$ a sampling signal, the phase of which can be controlled. Analog or digital circuits of this type are well-known in the art. Generally, a digital phase-locked oscillator includes a quartz oscillator that provides a high frequency sine wave. This signal is converted into a square wave and the resultant pulses are applied to a chain of dividers that supply a signal at the desired frequency. By varying the division ratios, the phase of the pulses supplied by the oscillator can be made to vary. This variation is controlled by an adjustment signal.

In the data mode of operation, switches 28 and 29 are both set to position A. It will be assumed that the appropriate equalizer, for example EQZ 1, has previously been selected and that switch 23 has been set to position A. The data signal received from the transmission channel passes through AGC circuit 21, bandpass filter 22 and equalizer EQZ 1. The output signal from EQZ 1 is sampled at the signaling rate $1/T$, and is converted to digital form in A/D converter 24. The output from converter 24 is fed to Hilbert transformer 25 which provides on lines 26 and 27 the in-phase and quadrature components of the input signal, respectively. Phase detector 30 extracts from these components the phase of the received signal and data detection device 32 derives therefrom the received data.

In the measurement mode of operation, the transmitter (FIG. 2) generates the measurement signal by causing the carrier to undergo consecutive phase changes of $+\pi/2$ and $-\pi/2$ radians at the signaling rate. The spectrum of this signal consists of three rays at frequencies $f_0$, $f_1$ and $f_2$.

Accordingly, the measurement signal being transmitted is obtained by superimposing three sine waves the respective frequencies of which are $f_o$, $f_1$ and $f_2$. These three sine waves may be expressed in simplified form as follows:

$$\left. \begin{array}{l} \cos(2\pi f_0 t - \frac{\pi}{4}) \\ \cos(2\pi f_1 t + \frac{\pi}{4}) \\ \cos(2\pi f_2 t + \frac{\pi}{4}) \end{array} \right\} \quad (1)$$

where $-\pi/4$, $+\pi/4$ and $\pi/4$ represent the phases of said three sine waves which result from the carrier phase changes. The measurement signal obtained at the input of the receiver takes the form of three superimposed sine waves $F_o$, $F_1$ and $F_2$ which may be expressed as $$\left. \begin{array}{l} F_0: \cos(2\pi f_0 t - \frac{\pi}{4} + \phi_0) \\ F_1: \cos(2\pi f_1 t + \frac{\pi}{4} + \phi_1) \\ F_2: \cos(2\pi f_2 t + \frac{\pi}{4} + \phi_2) \end{array} \right\} \quad (2)$$

where $\phi_o$, $\phi_1$ and $\phi_2$ represent the phase changes introduced by the transmission channel.

It is convenient to obtain the instantaneous phases $\psi_0$, $\psi_1$, and $\psi_2$ of sine waves $F_o$, $F_1$ and $F_3$, respectively, by writing relations (2) as $$F_o : \cos \psi_o \\ F_1 : \cos \psi_1 \\ F_2 : \cos \psi_2 \quad \} \quad (3)$$

where $$\psi_0 = 2\pi f_0 t - \frac{\pi}{4} + \phi_0 \\ \psi_1 = 2\pi f_1 t + \frac{\pi}{4} + \phi_1 \\ \psi_2 = 2\pi f_2 t + \frac{\pi}{4} + \phi_2 \quad \} \quad (4)$$

The slope of the envelope delay characteristic shown in FIG. 1 may be written $$S = \tau(f_2) - \tau(f_1) \quad (5)$$

where $\tau(f_1)$ and $\tau(f_2)$ represent the respective envelope delays at frequencies $f_1$ and $f_2$.

Assuming that the envelope delay characteristic is a curve of the second degree, it can be shown that the slope S may be expressed as $$S = \frac{4}{2\pi(f_2 - f_1)} (2\phi_0 - \phi_1 - \phi_2) \quad (6)$$

Combining relations (6) and (4), the slope S may be written as $$S = \frac{4}{2\pi(f_2 - f_1)} (\pi + 2\psi_0 - \psi_1 - \psi_2) \quad (7)$$

In practice, it may prove sufficient for the purposes of many applications to know the quantity $\theta$ defined as $$\theta = \pi/2 \, (f_2 - f_1) \, S \quad (8)$$

which, in accordance with (7), may be written as $$\theta = \pi + 2\pi_o - \psi_1 - \psi_2 \quad (9)$$

and which is representative of slope S. Note that relations (6), (7), and (9) are not time dependent.

The receiver shown in FIG. 4 uses relation (7) to determine slope S.

Referring again to FIG. 4, in the measurement mode of operation, switches 28 and 29 are both set to position B and switch 23 is initially set to position D. The measurement signal received via line 20 is transmitted through AGC circuit 21, filter 22, switch 23 (set to position D) and sampling device 53, and is converted to digital form in A/D converter 24. The output from A/D converter is fed to Hilbert transformer 25 which provides on lines 26 and 27 the in-phase and quadrature components, respectively, of the received signal. The in-phase component is inputted to filter 35 through switch 28 (set to position B) and line 33. Filter 35, an embodiment of which is shown by way of example in FIG. 5, consists of three elementary filters respectively centered at frequencies $f_o$, $f_1$ and $f_2$. Filter 35 extracts from the in-phase component of the received signal the in-phase components at frequencies $f_o$, $f_1$ and $f_2$ of that signal. The components at frequencies $f_o$, $f_1$ and $f_2$ of the received signal are the sine waves $F_o$, $F_1$ and $F_2$ defined earlier. The in-phase components $\cos \psi_o$, $\cos \psi_1$ and $\cos \psi_2$ of signals $F_o$, $F_1$ and $F_2$ are respectively obtained on output lines 37, 38 and 39 from filter 35. The quadrature component of the signal received on line 27 is inputted via switch 29 (set to position B) and line 34 to filter 36, which is identical to filter 35. The quadrature components $\sin \psi_o$, $\sin \psi_1$, and $\sin \psi_2$ of signals $F_o$, $F_1$ and $F_2$ are respectively obtained on output lines 41, 42 and 43 from filter 36. The in-phase and quadrature components of signals $F_o$, $F_1$ and $F_2$ are applied to buffer 40 where they are stored in registers and sequentially inputted in pairs to phase detector 46 as follows. Buffer 40 supplies on lines 44 and 45, respectively, components $\cos \psi_o$ and $\sin \psi_o$, then components $\cos \psi_1$ and $\sin \psi_1$ and finally components $\cos \psi_2$ and $\sin \psi_2$. Phase detector 46 derives the value of instantaneous phase $\psi_o$ from components $\cos \psi_o$ and $\sin \psi_o$, the value of instantaneous phase $\psi_1$ from components $\cos \psi_1$ and $\sin \psi_1$, and the value of instantaneous phase $\psi_2$ from components $\cos \psi_2$ and $\sin \psi_2$.

Phase detector 46 is a conventional device which receives as inputs the values of the sine and cosine of an angle and generates the value of that angle. Those skilled in the art will readily understand that, although the receiver of FIG. 4 is shown as including two phase detectors, 30 and 46, this is only for clarity. An actual receiver would include a single phase detector to be used as detector 46 in the measurement mode of operation and as detector 30 in the data mode.

Phases $\psi_o$, $\psi_1$ and $\psi_2$ are sequentially inputted to slope computation device 48. Device 48 computes the slope S of the envelope delay characteristic in accordance with relation (7) which is repeated below for convenience:

$$S = \frac{4}{2\pi(f_2 - f_1)} (\pi + 2\psi_0 - \psi_1 - \psi_2) \quad (7)$$

The digital value of slope S is available on output line 51 from device 48.

The value of slope S having thus be obtained, it was found that the appropriate fixed equalizer could be automatically selected from that value. As mentioned in the introductory section of this description, the telephone companies provide the profile within which the envelope delay characteristics of lines of a given quality lie. This makes it possible to determine the range within which the slopes S of the lines that exhibit the quality defined by said profile lie. For example, the CCITT recommendations for an unconditioned line specify a range of slopes of 1.7 ms. To select the appropriate equalizer, the range of slopes is divided up into N intervals and a fixed equalizer is provided for each of these. The slope S of the line being used is measured and the interval within which the measured slope S lies is selected together with the associated fixed equalizer. Referring again to FIG. 4, it is assumed that the range of slopes defined by its extreme values, for example $S_o$ and $S_3$, is divided into three intervals I, II and III, which are respectively defined by their extreme slope values $S_o - S_1$, $S_1 - S_2$ and $S_2 - S_3$. It is further assumed that equalizers EQZ 1, EQZ 2 and EQZ 3 are respectively associated with intervals I, II and III. It is therefore necessary, in order to determine in which interval the measured slope S lies, to compare that measured slope with the slope values $S_o$, $S_1$, $S_2$ and $S_3$ that define the intervals. It was found more convenient to use the quantity $\theta$ as defined by relations (8) and (9) to select the appropriate equalizer.

In accordance with relation (8), we may write $$\theta_i = \frac{\pi}{2}(f_2 - f_1) S_i \text{ for } i = 0, 1, 2 \text{ and } 3 \tag{10}$$

Instead of comparing the measured slope S with values $S_o$, $S_1$, $S_2$ and $S_3$, the measured quantity $\theta$ is compared with the values $\theta_o$, $\theta_1$, $\theta_2$ and $\theta_3$ as defined by relation (10).

Figure 8:
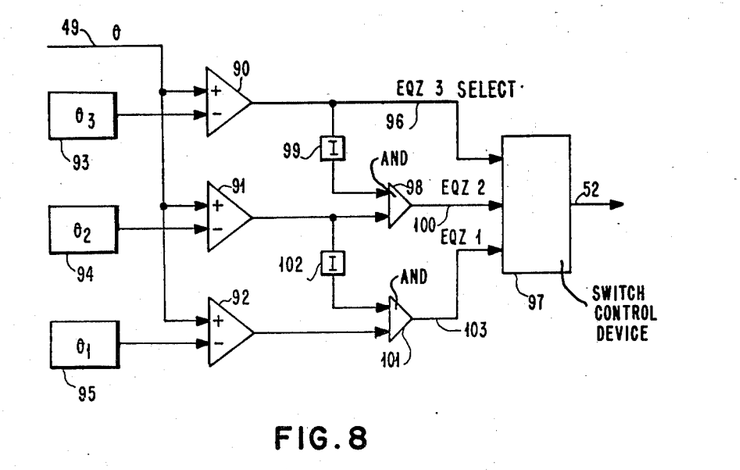
FIG. 8 shows an exemplary embodiment of the comparison and selection device 50 used in the receiver of FIG. 4.

In FIG. 4, the measured value of $\theta$ is provided by detector 48 on output line 49 and is applied to comparison and selection device 50, an exemplary embodiment of which is shown in FIG. 8. Device 50 compares the measured value of $\theta$ that is available on line 49 with $\theta_o$, $\theta_1$, $\theta_2$ and $\theta_3$ and causes switch 23 to be set to position A, B, or C depending on whether the measured value of $\theta$ lies between $\theta_o$ and $\theta_1$, between $\theta_1$ and $\theta_2$, or between $\theta_2$ and $\theta_3$.

The method of determining the phase intercept value will now be described. As has been mentioned, the received measurement signal is sampled at the signaling rate 1/T. However, it is known that the phase intercept value varies with the sampling signal phase, that is, with the phase of the clock signals that control the sampling. Accordingly, the phase intercept value can only be determined for a given value of the sampling signal phase. It will be assumed that the instantaneous phases $\psi_o$, $\psi_1$ and $\psi_2$ were measured at time t=o, that is with a sampling signal phase equal to zero. Phase $\phi_o$ represents the phase of signal $F_o$, that is, the phase of the received carrier, at t=o. It will further be assumed that the sampling signal phase will then be adjusted to a value $\phi_s$ for the transmission of data. It is therefore necessary to determine the phase intercept value for a given sampling signal phase $\phi_s$. To cause the sampling signal phase to rotate from o to $\phi_s$ is equivalent to delaying the sampling instant by a quantity $t_s$ defined as $$t_s = \frac{T}{2\pi} \phi_s \tag{11}$$

The phase $\phi_o'$ of the carrier received at time t=$t_s$ is expressed as $$\phi_o' = 2\pi f_o t_s + \phi_o \tag{12}$$

Previously, for the purpose of measuring the slope of the envelope delay characteristic, it was assumed that this characteristic was a curve of the second degree. It is now assumed that the phase characteristic is a curve of the third degree. The phase intercept value $\phi_i$ was found to vary linearly as a function of the slope.

For a sampling signal phase $\phi_s$, the phase intercept value $\phi_i$ can be expressed as $$\phi_i = \phi_o - K \cdot S$$

where the slope S is expressed in milliseconds and K is a proportionality constant whose value lies between 0 and 1.

It was found that a value of K=0.327 yielded very good results and this value will be used hereafter. The phase intercept value can be written as $$\phi_i = \phi_o - 0.327 S \tag{13}$$

where S is the slope expressed in milliseconds.

According to relation (12), relation (13) can be written as $$\phi_i = 2\pi f_o t_s + \phi_o - 0.327 S \tag{14}$$

The phase intercept value $\phi_i$ can also be expressed as a function of the phase measured at t=o. By putting t=o in relations (4), we get $$\phi_o = \psi_o + \pi/4$$

and relation (14) can then be written as $$\phi_i = 2\pi f_o t_s + \psi_o + \frac{\pi}{4} - .327 S \tag{15}$$

The teachings of French patent application No. 75 14020, filed by the present applicant on April 25, 1975 (publication No. 2 309 089), are employed in the receiver of FIG. 4 and the sampling signal phase is adjusted therein by causing it to rotate by the value $\phi_s = \phi_1 - \phi_2$.

Relation (11) becomes $$t_s = \frac{T}{2\pi}(\phi_1 - \phi_2) \tag{16}$$

or, according to relations (4)

$$t_s = \frac{T}{2\pi}(\psi_1 - \psi_2) \tag{17}$$

Substituting the latter value of $t_s$ in relation (15), we get $$\phi_i = f_o T(\psi_1 - \psi_2) + \psi_0 + \frac{T}{2\pi} - .327 S \tag{18}$$

Referring again to FIG. 4, the value of slope S and phases $\psi_o$, $\psi_1$ and $\psi_2$, available at the output of slope computation device 48 on lines 51, 54, 55 and 56, are inputted to phase intercept value computation device 57 which computes the phase intercept value $\phi_i$ in accordance with relation (18). The computed value of $\phi_i$ is fed via line 58 to data detection device 32 the operation of which will be described later with reference to FIG. 10. Phase-locked oscillator 59 receives from device 57 (FIG. 9) the difference $\psi_1 - \psi_2$ as phase adjustment signal. Thus, oscillator 59 will supply at the signaling rate 1/T a sampling signal exhibiting a phase $\phi_s = \phi_1 - \phi_2$ to control sampling device 53 for the purposes of the transmission of data.

Figure 5:
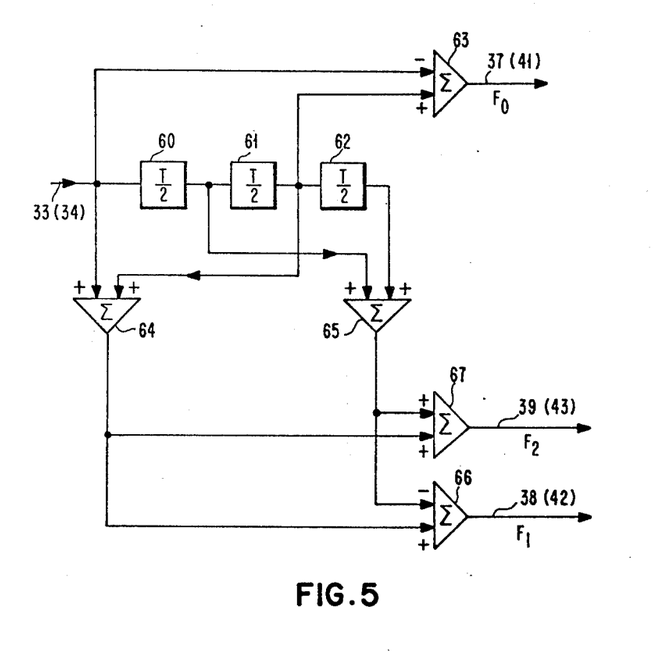

The general configuration of a digital filter which can be used as filter 35 or 36 in the receiver of FIG. 4 will now be described with reference to FIG. 5. The reference numerals on the input and output lines of the filter shown in FIG. 5 relate to filter 35 while the reference numerals between parentheses relate to filter 36. The in-phase component of the received signal is inputted via line 33 (FIG. 4) to a delay line comprising three delay elements 60, 61 and 62, each of which introduces a delay of T/2 seconds. The input signal on line 33 is subtracted from the output signal from delay element 61 in a subtractor 63 which provides the in-phase component of signal $F_o$ on line 37. The input signal on line 33 is also added to the output signal from delay element 61 in adder 64. The output signal from delay element 60 is added to the output signal from delay element 62 in adder 65. The output signal from adder 65 is subtracted from the output signal from adder 64 in subtractor 66 which provides the in-phase component of signal $F_1$ on line 38. The output signals from adders 64 and 65 are added together in adder 67 which provides the in-phase component of signal $F_2$ on line 39. When the filter shown in FIG. 5 is used as filter 36, it is provided via line (34) with the quadrature component of the received signal and supplies on lines (41), (42) and (43) the quadrature components of signals $F_o$, $F_1$ and $F_2$, respectively.

Figure 6:
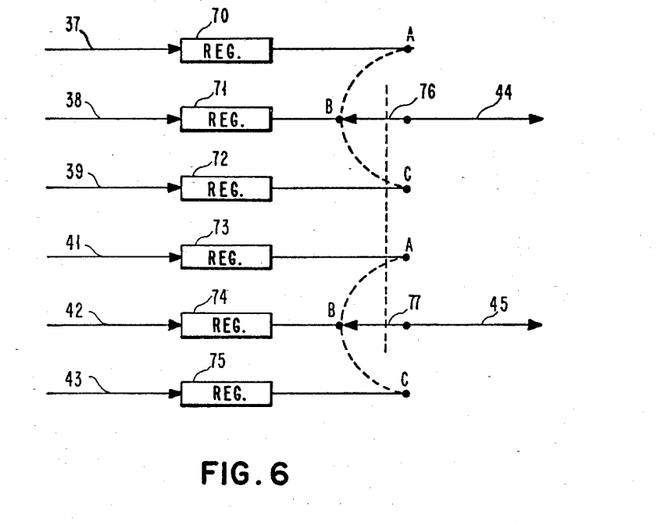
FIG. 6 shows an exemplary embodiment of the buffer 40 used in the receiver of FIG. 4.

FIG. 6 illustrates an exemplary digital embodiment of buffer 40 represented generally by a rectangle in FIG. 4. The in-phase components of signals $F_o$, $F_1$ and $F_2$ available on lines 37, 38 and 39, respectively, are stored in registers 70, 71 and 72, while the quadrature components of signals $F_1$, $F_1$ and $F_2$ available on lines 41, 42 and 43 respectively, are stored in registers 73, 74 and 75. The outputs of registers 70, 71 and 72 are connected to positions A, B and C, respectively, of a three-position switch 76, the output of which is connected to line 44. The outputs of registers 73, 74 and 75 are connected to positions A, B and C, respectively, of a three-position switch 77, the output of which is connected to line 45. Switches 76 and 77 are simultaneously set to positions A, B or C. When both switches are set to position A, the contents of registers 70 and 73 are applied to lines 44 and 45, respectively, and so on.

Figure 7:
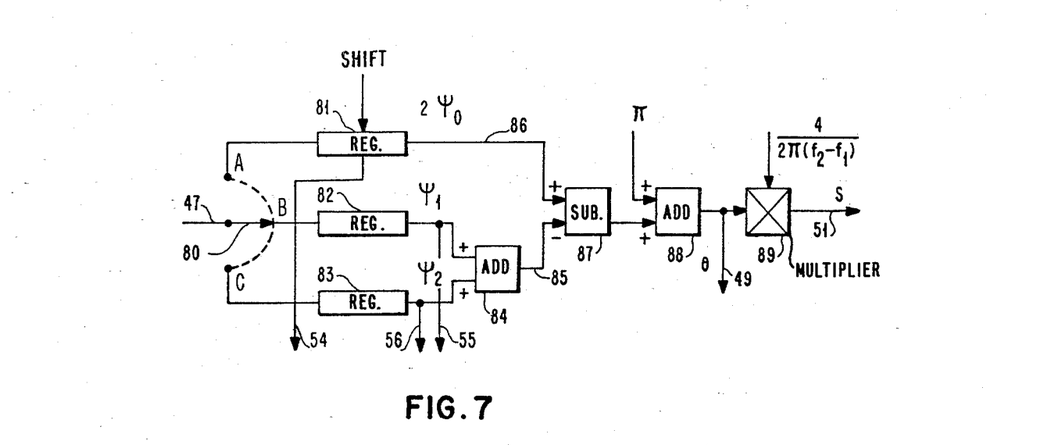
FIG. 7 shows an exemplary embodiment of the slope computation device 48 used in the receiver of FIG. 4.

FIG. 7 is an exemplary digital embodiment of the slope computation device 48 shown generally as a block in FIG. 4. The output of phase detector 46 (FIG. 4) is connected via line 47 to the common input of a three-position switch 80 whose positions A, B and C are connected to the input of a shift register 81 and the inputs of registers 82 and 83. Thus, the phases $\psi_o$, $\psi_1$ and $\psi_2$, successively computed by detector 46, are stored in registers 81, 82 and 83, respectively, through switch 80. The contents of shift register 81 are then shifted one bit position to the left so that, subsequent to this operation, register 81 will contain the quantity $2\psi_o$. An adder 84, whose inputs are connected to the outputs of registers 82 and 83, provides the sum $\psi_1+\psi_2$ on its output line 85. The value $2\psi_o$ read out of register 81 is applied via line 86 to the (+) input of a subtractor 87 whose (−) inputs receives the sum $\psi_1+\psi_2$ via line 85. Subtractor 87 provides the quantity $2\psi_o-\psi_1-\psi_2$ to which the value of $\pi$ is added by an adder 88. The quantity $$\theta = \pi + 2\psi_o - \psi_1 - \psi_2$$

is available at the output of adder 88 on line 49. The value of $\theta$ so computed is multiplied by the quantity $$\frac{4}{2\pi(f_2 - f_1)}$$

in multiplier 89. Thus, multiplier 89 provides on its output line 51 the value of the slope S in accordance with relations (7) and (8). The phase $\psi_o$ obtained by reading only the leftmost bits out of shift register 81 is available on line 54. Phases $\psi_1$ and $\psi_2$ read out of registers 82 and 83 are available on lines 55 and 56, respectively.

FIG. 8 shows by way of example a digital embodiment of the comparison and selection device 50 represented by a block in FIG. 4. The value of $\theta$ as computed by device 48 (FIG. 4) is applied via line 49 to the (+) inputs of three comparators 90, 91 and 92. The (−) inputs of these comparators are respectively connected to storage means 93, 94 and 95, storing the values of $\theta_1$, $\theta_2$ and $\theta_3$. In the example shown in the figure, comparators 90-92 provide an up level when the value of the signal applied to their (+) inputs exceeds that of the signal applied to their (−) inputs. The output of comparator 90 is connected via equalizer EQZ 3 selection line 96 to an input of a switch control device 97. The output from comparator 91 is applied to an input of a two-input AND gate 98, the other input of which receives the output from comparator 90 as inverted by an inverter 99. The output of AND gate 98 is connected to an input of control device 97 via equalizer EQZ 2 selection line 100. The output from comparator 92 is applied to an input of a two-input AND gate 101, the other input of which receives the output from comparator 91 as inverted by an inverter 102. The output of AND gate 101 is connected via equalizer EQZ 1 selection line 103 to an input of control device 97. In operation, assuming, for example, that $\theta_1 < \theta < \theta_2$, the output from comparator 90 is at a low level which deactivates line 96, and the output from comparator 91 is at a low level which inhibits AND gate 98, thereby deactivating line 100. The output from comparator 92 is at an up level and that from inverter 102 also is at an up level. Thus, AND gate 101 is enabled and activates EQZ 1 selection line 103. Control device 97 is a conventional device which causes switch 23 to be set to position A, B or C depending on whether line 103, 100 or 96 is activated.

Figure 9:
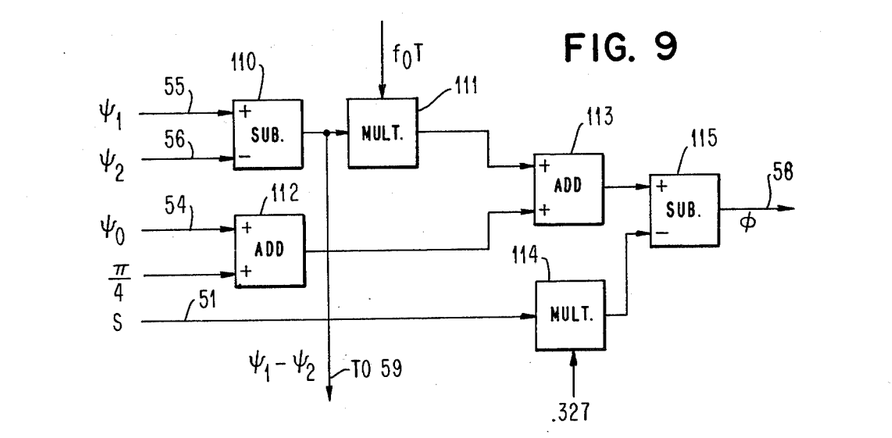
FIG. 9 shows an exemplary digital embodiment of the phase intercept computation device 57 of FIG. 4.

Referring now to FIG. 9, an exemplary digital embodiment of the phase intercept value computation device 57 is shown. Phases $\psi_1$ and $\psi_2$ available on output lines 55 and 56 from slope computation device 48 are respectively applied to the (+) and (−) inputs of a subtractor 110 which supplies the difference $\psi_1-\psi_2$. This difference is multiplied by the quantity $f_oT$ in a multiplier 111 which therefore supplies the quantity $f_oT(\psi_1-\psi_2)$. Phase $\psi_o$ available on output line 54 from device 48 is applied to a (+) input of an adder 112 the other (+) input of which receives the quantity $\psi/4$. The outputs from multipliers 111 and adder 112 are added together in an adder 113 which consequently supplies the quantity $$\psi_0 + \frac{\pi}{4} + f_0T(\psi_1 - \psi_2).$$

The value of slope S available on output line 51 from device 48 is multiplied by the quantity 0.327 in a multiplier 114 which has its output connected to the (−) input of a subtractor 115. The (+) input of this subtractor is connected to the output of adder 113. Subtractor 115 supplies on its output line 58 the phase intercept value $\phi_i$ determined in accordance with relation (18). The difference $\psi_1-\psi_2$ is also applied as a control signal to the oscillator 59 of FIG. 4.

Figure 10:
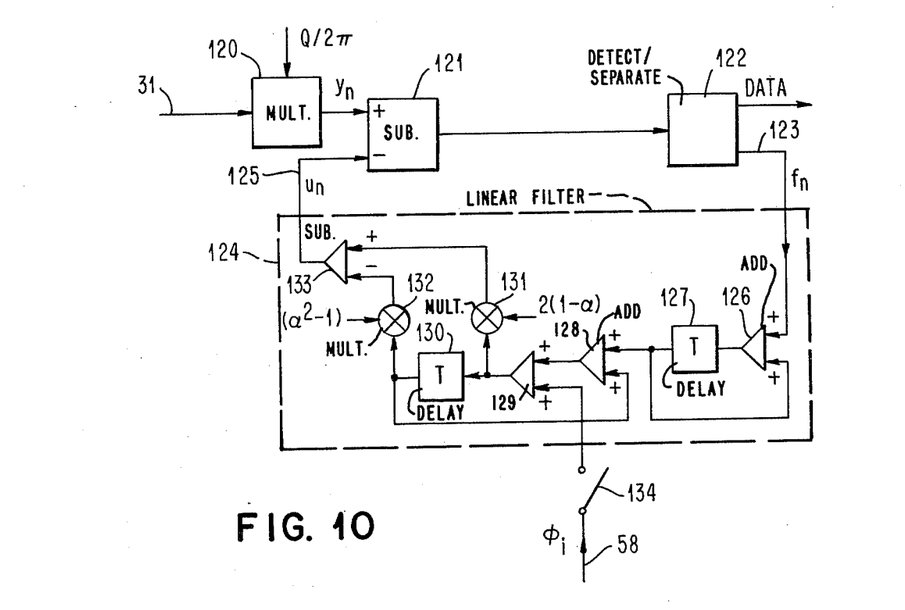
FIG. 10 is an exemplary digital embodiment of the data detection device 32 of FIG. 4.

Referring now to FIG. 10, there is shown an exemplary digital embodiment of the data detection device 32 which eliminates the effects of the phase intercept as measured by means of the present method. The discrete value of the phase of the received signal as determined by phase detector 30 (FIG. 4) is applied via line 31 to one of the inputs of a multiplier 120, the other input of which receives the quantity $Q/2\pi$. The output of multiplier 120 is connected to the (+) input of a subtractor 121 which has its output connected to the input of a detector-separator 122, one output of which provides the data and the other output of which is connected via line 123 to the input of a linear filter 124. The output of filter 124 is connected via line 125 to the (−) input of subtractor 121. Filter 124 comprises an adder 126, an input of which is connected to line 123 and the output of which is connected to a delay element 127 introducing a T-second delay. The output of delay element 127 is fed back to the other input of adder 126 and to an input of an adder 128. The output of adder 128 is connected to an input of an adder 129, the output of which is connected to the input of a delay element 130 which introduces a T-second delay and the output of which is fed back to the other input of adder 128. The output of adder 129 is also connected to an input of a multiplier 131 the other input of which receives the quantity $2(1-\alpha)$. The output of delay element 130 is also connected to an input of a multiplier 132, the other input of which receives the quantity $(\alpha^2-1)$. The outputs from multipliers 131 and 132 are added together in an adder 133 whose output, which is the output from filter 124, is connected via line 125 to the (−) input of subtractor 121. The other input of adder 129 is connected to line 58 through a switch 134. With the exception of adder 129, the device shown in FIG. 10 is that described in detail in U.S. Pat. No. 3,972,000.

In the data mode of operation, switch 134 is open. It is, therefore, as if the output of adder 128 were directly connected to the input of delay element 130. The device operates in the manner described in detail in the aforementioned patent application No. 74 30001, (publication No. 2 283 606) to which reference should be made. Briefly, the received phase is multiplied by $Q/2\pi$ where Q represents the number of distinct discrete values the PSK signal can take on at each signaling instant. The purpose of this multiplication is to provide, to the (+) input of subtractor 121, a signal $y_n$ equal to an integer in the absence of noise and more particularly in the absence of phase intercept. The (−) input of subtractor 121 receives an error signal $u_n$ supplied by the linear filter 124 whose transfer function $w(z)$ is defined as $$w(z) = \frac{2(1-\alpha)z^{-1} + (\alpha^2-1)z^{-2}}{1 - 2z^{-1} - z^{-2}}$$

where $0 < \alpha < 1$.

Subtractor 121 supplies the difference $y_n - u_n$ which is inputted to detector-separator 122. This difference can also be written as
$$y_n - u_n = I_n + f_n$$

where $I_n$ is a positive integer representative of the data, and $f_n$ is a number whose value lies between 0 and 1, and which is representative of a residual error.

Detector-separator 122, an exemplary embodiment of which is shown in FIG. 11 of the aforementioned U.S. Pat. No. 3,972,000, supplies the integer $I_n$ representative of the data, and also provides on line 123 the residual error $f_n$. Filter 124 generates the error signal $u_n$ from the residual error $f_n$.

In the measurement mode of operation, switches 28 and 29 (FIG. 4) are both set to position B so that no signal is inputted via line 31 to the device of FIG. 10, and switch 134 is closed. The phase intercept value $\phi_i$ as computed by device 57 is inputted via line 58 to adder 129 as an initialization value for filter 124. After the phase intercept value $\phi_i$ has been fed to filter 124, switch 134 opens and the device can operate in the data mode.

The foregoing describes the manner in which the phase intercept value can be used in a PSK receiver of the type shown in FIG. 4. It will be understood by those skilled in the art that the phase intercept value as determined by means of the present method can also be used to adjust the phase of the local reference carrier in a conventional PSK receiver wherein the signal received from the transmission channel is demodulated by a locally generated reference carrier.

Figure 11:
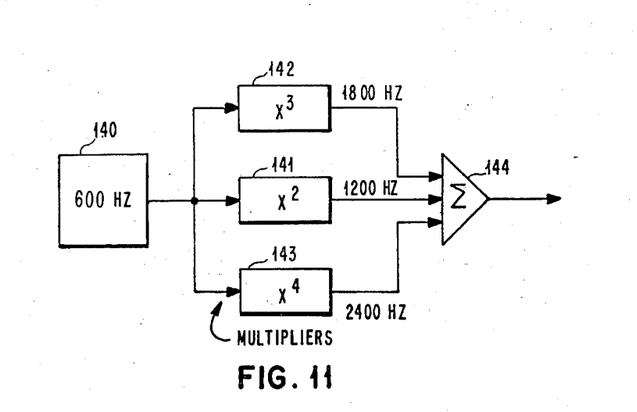
FIG. 11 shows another embodiment of a device for generating the measurement signal.

Thus far, there has been described with reference to FIGS. 2–10 a transmission system which incorporates means for measuring the slope S and the phase intercept value $\phi_i$ and for automatically selecting a fixed equalizer. In this system, successive carrier phase changes of $+\pi/2$ and $-\pi/2$ radians are used to generate the measurement signal comprised of three synchronous frequencies $f_o$, $f_1$ and $f_2$. It will be understood by those skilled in the art that other means could be used to generate the measurement signal. For example, assuming that it is desired to measure the slope S of a voice-band transmission channel, one may choose $f_o = 1800$ Hz, $f_1 = 1200$ Hz and $f_2 = 2400$ Hz and generate the measurement signal from a 600 Hz oscillator as shown in FIG. 11. The measurement signal generation device shown in FIG. 11 includes a 600 Hz oscillator 140 and three frequency multipliers 141, 142 and 143 which multiply that frequency by two, by three and by four, respectively, so that they provide signals at 1200 Hz, 1800 Hz and 2400 Hz, respectively. The outputs from frequency multipliers 141–143 are added together in a summing device 144 which thus provides a measurement signal resulting from the superimposition of three sine waves of respective frequencies $f_o$, $f_1$ and $f_2$.

In this case, which is the general case, the three sine waves can be expressed in simplified form as follows:

$$\left. \begin{array}{l} \cos(2\pi F_0 t + \phi'_0) \\ \cos(2\pi F_1 t + \phi'_1) \\ \cos(2\pi F_2 t + \phi'_2) \end{array} \right\} \quad (1')$$

where $\phi'_o$, $\phi'_1$ and $\phi'_2$ are the phases of the transmitted sine waves. Note that relations (1), which express the three sine waves making up the measurement signal generated by means of successive carrier phase changes of $+\pi/2$ and $-\pi/2$, are nothing but particular cases of the above relations (1'). Relations (1) are derived from relations (1') by giving phases $\phi'_o$, $\phi'_1$ and $\phi'_2$ the following values:

$$\phi'_0 = -\frac{\pi}{4} \quad \phi'_1 = \phi'_2 = +\frac{\pi}{4}$$

Using the assumptions made with respect to relations (1'), relations (2) become:

$$\left. \begin{array}{l} F_0:\cos(2\pi f_0 t + \phi_0 + \phi'_0) \\ F_1:\cos(2\pi f_1 t + \phi_1 + \phi'_1) \\ F_2:\cos(2\pi f_2 t + \phi_2 + \phi'_2) \end{array} \right\} \quad (2')$$

Similarly, relations (4) become:

$$\left. \begin{array}{l} \psi_0 = 2\pi f_0 t + \phi_0 + \phi'_0 \\ \psi_1 = 2\pi f_1 t + \phi_1 + \phi'_1 \\ \psi_2 = 2\pi f_2 t + \phi_2 + \phi'_2 \end{array} \right\} \quad (4')$$

Combining (6) and (4'), we find the general expression for slope S where the three generated sine waves of frequencies $f_o$, $f_1$ and $f_2$ have the respective phases $\phi'_o$, $\phi'_1$ and $\phi'_2$:

$$S = \frac{4}{2\pi(f_2 - f_1)} (2\psi_0 - \psi_1 - \psi_2 - 2\phi'_0 + \phi'_1 + \phi'_2) \quad (7')$$

The quantity $\theta$ defined by relation (8), which is repeated below for convenience $$\theta = \frac{\pi}{4}(f_2 - f_1)S \quad (8)$$

becomes, starting with relation (7'):

$$\theta = 2\psi_0 - \psi_1 - \psi_2 - 2\phi'_0 + \phi'_1 + \phi'_2 \quad (9')$$

Of course, the relation that gives the phase intercept value is also modified. By putting $t=o$ in relations (4'), we obtain $$\phi_o = \psi_o - \phi'_o$$

Substituting the latter value of $\phi_o$ in relation (12), we get $$\phi_o = 2\pi f_o t_s + \psi_o - \phi'_o \quad (12')$$

Relation (15) also becomes $$\phi_i = 2\pi f_o t_s + \psi_o - \phi'_o - 0.327 S \quad (15')$$

where the value of the slope S is, of course, that defined by relation (7'). If the phase of the sampling signal is rotated by the value $\phi_1 - \phi_2$, that is to say, if $$t_s = \frac{T}{2\pi}(\phi_1 - \phi_2) \quad (16)$$

then, in accordance with relations (4'), we will obtain at $t=o$ $$\phi_s = \phi_1 - \phi_2 = \psi_1 - \psi_2 - \phi'_1 - \phi'_2 \quad (17')$$
and
$$t_s = \frac{T}{2\pi}(\psi_1 - \psi_2 - \phi'_1 - \phi'_2)$$

The phase intercept value will be written as $$\phi_i = f_o T(\psi_1 - \psi_2 - \phi'_1 - \phi'_2) + \psi_o - \phi'_o - 0.327 S \quad (18')$$

Note that by giving phases $\phi'_o$, $\phi'_1$ and $\phi'_2$ the values $$\phi'_0 = -\frac{\pi}{4} \quad \phi'_1 = \phi'_2 = +\frac{\pi}{4}$$

in relations (7'), (9'), (15') and (18'), the relations (7), (9), (15) and (18) previously used are respectively obtained.

It will be understood by those skilled in the art that the use of relation (7') to determine the slope S only requires minor changes in the device illustrated in FIGS. 4-10. All that need be done in the computation device of FIG. 7 is to add to the output signal from the subtractor 87 the corrective term $-2\phi'_o + \phi'_1 + \phi'_2$, instead of the value of $\pi$ as shown in the Figure.

The device of FIG. 7 being thus modified, the device of FIG. 9 will be modified by subtracting the corrective term $\phi'_1 + \phi'_2$ from the signal obtained at the output of subtractor 110.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent is:

1. Apparatus for generating a signal from which the phase intercept value of a transmission channel at a given frequency can be determined, comprising:
   means for generating a measurement signal for transmission on said channel at a given signaling rate, the measurement signal having components at a given frequency $f_o$, at a lower frequency $f_1 = f_o - 1/(2T)$ and at an upper frequency $f_2 = f_o + 1/(2T)$ where $1/T$ is the signaling rate;
   means for receiving said measurement signal and for extracting therefrom signals proportional to the instantaneous phases of the received signal at the given, upper and lower frequencies, said extracting means further comprising;
   means for sampling the received measurement signal at the signaling rate,
   transformer means for separating the sampled measurement signal into in-phase and quadrature components,
   means for filtering each of said components to derive the in-phase and quadrature components at the given, upper and lower frequencies, and
   means for combining the in-phase and quadrature components at each of the frequencies to extract the instantaneous phase signals at each of the frequencies;
   means connected to said extracting means for generating a signal proportional to the slope of said channel in the region defined by the upper and lower frequencies as a function of the values of the three instantaneous phase signals and the difference between the upper and lower frequencies; and
   means connected to said generating means for deriving the phase intercept signal as a function of the slope signal, the three instantaneous phase signals, the signaling rate and the given frequency.

2. A method for deriving a signal from which the phase intercept value of a transmission channel at a given frequency can be determined, comprising the steps of:
   generating a mesurement signal having sinusoidal components at a given frequency and upper and lower frequencies spaced equally from the given frequency;
   transmitting the measurement signal over the transmission channel to a receiving unit;
   operating on the received measurement signal to extract signals proportional to the instantaneous phases of the received measurement signal at the given, upper and lower frequencies by
   sampling the received measurement signal at the signaling rate,
   converting the sampled signal to a digital format,
   separating the digitized, sampled signal into in-phase and quadradure components,
   filtering the separated components to derive the in-phase and quadrature components at the given, upper and lower frequencies, and
   combining the in-phase and quadrature components at each of the frequencies to derive the instantaneous phase signals for each of the frequencies;

combining said instantaneous phase signals and a signal proportional to the difference between the upper and lower frequencies to derive a signal proportional to the slope of the channel in the region defined by the upper and lower frequencies; and operating on the instantaneous phase signals, the slope signal and signals proportional to the signaling rate and the given frequency to derive the signal from which the phase intercept value can be determined, said last-named step including the further steps of generating a first signal proportional to the difference between the instantaneous phase signals for the upper and lower frequencies, generating a second signal proportional to the product of said first signal, the given frequency and the signaling rate, generating a third signal proportional to the generated slope signal, generating a fourth signal proportional to the sum of said second signal and the instantaneous phase signal for the given frequency, and subtractively combining said third and fourth signals to produce the signal from which the phase intercept value can be determined.

3. A system for initializing a receiver to reduce the effects of phase intercept caused by transmission channel distortion, said system including:

means for generating a measurement signal for transmission on said channel at a given signaling rate, the measurement signal having components at a given frequency and at upper and lower frequencies spaced uniformly from the given frequency;

means for receiving said measurement signal and for extracting therefrom signals proportional to the instantaneous phases of the received signal at the given, upper and lower frequencies;

means connected to said extracting means for generating a signal proportional to the slope of said channel in the region defined by the upper and lower frequencies as a function of the values of the three instantaneous phase signals and the difference between the upper and lower frequencies;

means connected to said generating means for deriving the phase intercept signal as a function of the slope signal, the three instantaneous phase signals, the signaling rate and the given frequency; and data detection means including a filter having one input from said signal deriving means and an output which is subtractively combined with received data signals and switching means for isolating the data detection means from the data path during an initialization phase while connecting the filter to the output from said signal deriving means.

4. A system as defined in claim 3 wherein said phase intercept signal deriving means further comprises:

means for generating a first signal proportional to the difference between the instantaneous phase signals for the upper and lower frequencies;

means for generating a second signal proportional to the product of said first signal, the given frequency and the signaling rate;

means for generating a third signal proportional to the generated slope signal;

means for generating a fourth signal proportional to the sum of said second signal and the instantaneous phase signal for the given frequency; and means for subtractively combining said third and forth signals to produce the signal from which the phase intercept value can be determined.

5. A system as defined in claim 4 wherein said data detection means further comprises:

a data detector-separator having a data output and a residual error output;

a linear filter circuit having one input connected to the residual error output from said data detector-separator and another input selectively connectable through said switching means to the output from said signal deriving means;

and a subtractor having a first input for receiving data signals, a second input for receiving phase intercept compensating signals from said linear filter circuit and an output connected to the input of said data detector-separator.

6. A system as defined in claim 5 wherein said extracting means further comprises:

means for sampling the received measurement signal at the signaling rate;

transformer means for separating the sampled measurement signal into in-phase and quadrature components;

means for filtering each of said components to derive the in-phase and quadrature components at the given, upper and lower frequencies; and means for combining the in-phase and quadrature components at each of the frequencies to extract the instantaneous phase signals at each of the frequencies.

7. A method for initializing a receiver to reduce the effects of phase intercept caused by transmission channel distortion, said method including the steps of:

generating a measurement signal having sinusoidal components at a given frequency and upper and lower frequencies spaced equally from the given frequency;

transmitting the measurement signal over the transmission channel to a receiving unit;

operating on the received measurement signal to extract signals proportional to the instantaneous phases of the received measurement signal at the given, upper and lower frequencies;

combining said instantaneous phase signals and a signal proportional to the difference between the upper and lower frequencies to derive a signal proportional to the slope of the channel in the region defined by the upper and lower frequencies;

operating on the instantaneous phase signals, the slope signal and signals proportional to the signaling rate and the given frequency to derive the signal from which the phase intercept value can be determined; and setting the output of a linear filter in a feedback loop to provide a compensating signal proportional to the derived phase intercept signal, the output being subtracted from applied data during post-initialization receiver operation.

8. A method as defined in claim 7 wherein the step of operating on signals to derive the phase intercept signal further includes the steps of:

generating a first signal proportional to the difference between the instantaneous phase signals for the upper and lower frequencies;

generating a second signal proportional to the product of said first signal, the given frequency and the signaling rate;

generating a third signal proportional to the generated slope signal;

generating a fourth signal proportional to the sum of said second signal and the instantaneous phase signal for the given frequency; and subtractively combining said third and fourth signals to produce the signal from which the phase intercept value can be determined.

9. A method as defined in claim 8 wherein said extracting step further includes the steps of:

sampling the received measurement signal at the signaling rate;

converting the sampled signal to a digital format;

separating the digitized, sampled signal into in-phase and quadrature components;

filtering the separated components to derive the in-phase and quadrature components at the given, upper and lower frequencies; and combining the in-phase and quadrature components at each of the frequencies to derive the instantaneous phase signals for each of the frequencies.

* * * * *